United States Patent [19]

Sugita et al.

[11] Patent Number: 4,543,531
[45] Date of Patent: Sep. 24, 1985

[54] DIGITAL DATA DETECTING APPARATUS

[75] Inventors: Junkichi Sugita, Ebina; Hiroaki Yada, Atsugi, both of Japan

[73] Assignee: Sony Corporation, Tokyo, Japan

[21] Appl. No.: 552,118

[22] Filed: Nov. 16, 1983

[30] Foreign Application Priority Data

Nov. 17, 1982 [JP] Japan .................................. 57-201659

[51] Int. Cl.$^4$ .............................................. H03D 3/18
[52] U.S. Cl. ...................................... 329/50; 329/104; 329/110; 329/122; 375/80; 375/81; 375/110; 375/120
[58] Field of Search .................. 329/50, 104, 110, 122, 329/126; 375/25, 80, 81, 82, 94, 110, 120; 455/214

[56] References Cited

U.S. PATENT DOCUMENTS 4,087,628 5/1978 Sanders et al. ......................... 375/81
4,371,975 2/1983 Dugan .................................. 329/50

Primary Examiner—Eugene R. LaRoche
Assistant Examiner—James C. Lee
Attorney, Agent, or Firm—Lewis H. Eslinger; Alvin Sinderbrand

[57] ABSTRACT

A digital data detecting apparatus comprises means for sampling an input digital signal at a frequency which is M times (M>1) higher than a channel bit rate, means responsive to two adjacent sampled values for computing an interval from a point where the digital signal intersects a reference level to a sampling time, and means responsive to an output from the computing means for generating a data detecting signal for detecting data of the digital signal.

5 Claims, 17 Drawing Figures

DIGITAL DATA DETECTING APPARATUS

BACKGROUND OF THE INVENTION

The present invention relates to a digital data detecting apparatus.

Digital tape recorders which have been developed in recent years record digital audio signals modulated by PCM with k bits (16 bits, for example) in n tracks on a magnetic tape. There has been proposed a circuit, as shown in FIG. 1 of the accompanying drawings, for playing back the magnetic tape on which such digital audio signals are recorded.

As illustrated in FIG. 1, n playback heads $1_1, 1_2, \ldots 1_n$ are arranged transversely across the magnetic tape in alignment with the n tracks, respectively. To the playback heads $1_1-1_n$, there are respectively connected preamplifiers $2_1, 2_2, \ldots 2_n$, equalizers $3_1, 3_2, \ldots 3_n$, comparators $4_1, 4_2, \ldots 4_n$, PLL (phase-locked loop) circuits $5_1, 5_2, \ldots 5_n$, and data detecting circuits $6_1, 6_2, \ldots 6_n$.

The circuit arrangement connected to the playback head $1_1$ will be described as a typical circuit system. The equalizer $3_1$ issues a reproduced signal having an eye pattern as shown in FIG. 2 at A. The actual output waveform of the equalizer $3_1$ is an integrated waveform of the positive or negative half wave of the eye pattern which corresponds to the digital data on being recorded. For example, where the data at the time of being recorded comprises the data as shown in FIG. 2 at B, a reproduced waveform after it has been equalized is as illustrated in FIG. 2 at C. The signal from the equalizer $3_1$ is applied to the comparator $4_1$ in which it is compared with a detection reference level Vs. The comparator $4_1$ produces an output as shown in FIG. 2 at D. The comparator output has rising and falling edges displaced due to jitter, and is applied to the PLL circuit $5_1$ and the data detecting circuit $6_1$. The PLL circuit $5_1$ is responsive to the comparator output for generating a clock $\phi$ in synchronism with the reproduced signal as shown in FIG. 2 at E. The data detecting circuit $6_1$ comprises a D flip-flop, for example, for reading the comparator output based on the clock $\phi$ to gain the original data as shown in FIG. 2 at F. Where the clock has such a phase that a positive-going edge is at 0° and a following negative-going edge at 180°, the comparator output is detected at 0°. The falling edge at 180° of the clock $\phi$ corresponds to the point where the reproduced signal intersects the detection reference level Vs. The detected data is then fed to a digital signal processing circuit 7 for signal processing.

The conventional circuitry shown in FIG. 1 requires n channels of circuit systems each composed of a preamplifier, an equalizer, a comparator, a PLL circuit, and a data detecting circuit, and hence has an increased number of connecting wires, resulting in a complex circuit arrangement. Since the circuitry of FIG. 1 comprises analog circuits, it has been difficult to incorporate integrated circuits in circuit design.

SUMMARY OF THE INVENTION

It is a first object of the present invention to provide a digital data detecting apparatus having a simple circuit arrangement.

A second object of the present invention is to provide a digital data detecting apparatus which can easily be implemented by integrated circuits.

A third object of the present invention is to provide a single digital data detecting apparatus capable of detecting data from signals reproduced simultaneously from a plurality of tracks.

According to the present invention, there is provided a digital data detecting apparatus comprises means for sampling an input digital signal at a frequency which is M times (M>1) higher than a channel bit rate, means responsive to two adjacent sampled values for computing an interval from a point where the digital signal intersects a reference level to a sampling time, and means responsive to an output from the computing means for generating a data detecting signal for detecting data of the digital signal. The generating means may comprise means for generating a phase position of a sampling time with a channel bit period being divided into N equal sections having phase positions expressed by 0 through N−1, means for comparing a value obtained by adding N/2 to the output from the computing means with an output from the phase position generating means, means responsive to an output from the comparing means for controlling the phase position generating means, and means for generating the data detecting signal in response to an output from the phase position generating means. The data detecting signal generating means may include means for generating a data detecting signal by determining that when the phase positions $p_i$, $p_{i+1}$ of two adjacent sampling times have the relationship: $p_i > p_{i+1}$, there is a data detecting point between the phase positions of the two sampling times. The input signal may comprise successive signals generated by sampling a plurality of digital signals at mutually different timings.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 3:
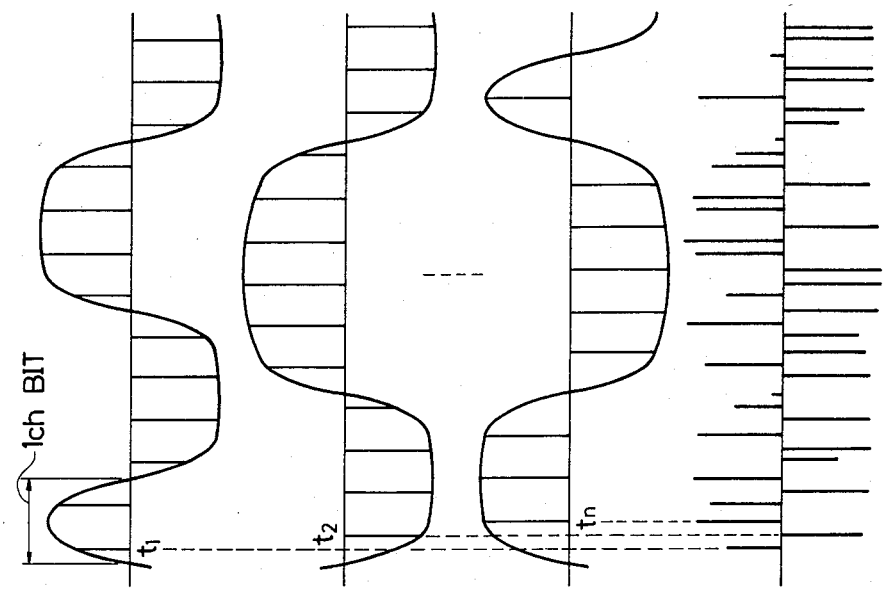
FIG. 3 is a diagram of signal waveforms showing the principles of the present invention.

FIG. 3 shows the waveforms of signals reproduced respectively from n tracks on a magnetic tape at A, B, and C, respectively. The reproduced signals are produced from n playback heads, respectively, at the same time. According to the present invention, the reproduced signals are applied to a multiplexer, as will be described later on with reference to FIG. 7, for sampling the signals at mutually different timings for time-division multiplex.

In FIG. 3, the signals are sampled successively at times $t_1, t_2, \ldots t_n$ to convert parallel signals reproduced from the respective tracks into successive signals as shown in FIG. 3 at D.

Where PCM signals are modulated by NRZ modulation systems (NRZI system, 4/5MNRZI system, or 8-to-10 conversion system) with a channel bit rate being f bits/sec., the necessary bandwidth up to f Hz is enough because of Nyquist theorem. Accordingly, no original information is lost or damaged if the sampling frequency is 2f Hz. In FIG. 3, therefore, the signal is sampled at least twice during a period corresponding to one channel bit. The sampling frequency may generally be expressed as Mf (M>1).

It is only necessary for the circuit following the multiplexer to supply such successive signals to a data detecting apparatus (described later on), and hence the circuit arrangement is rendered simple. Detection of the original data from the successive signals in the respective tracks requires clocks in synchronism with the reproduced signals in the respective tracks. It is difficult however to generate such clocks directly from the successive signals.

Figure 4:
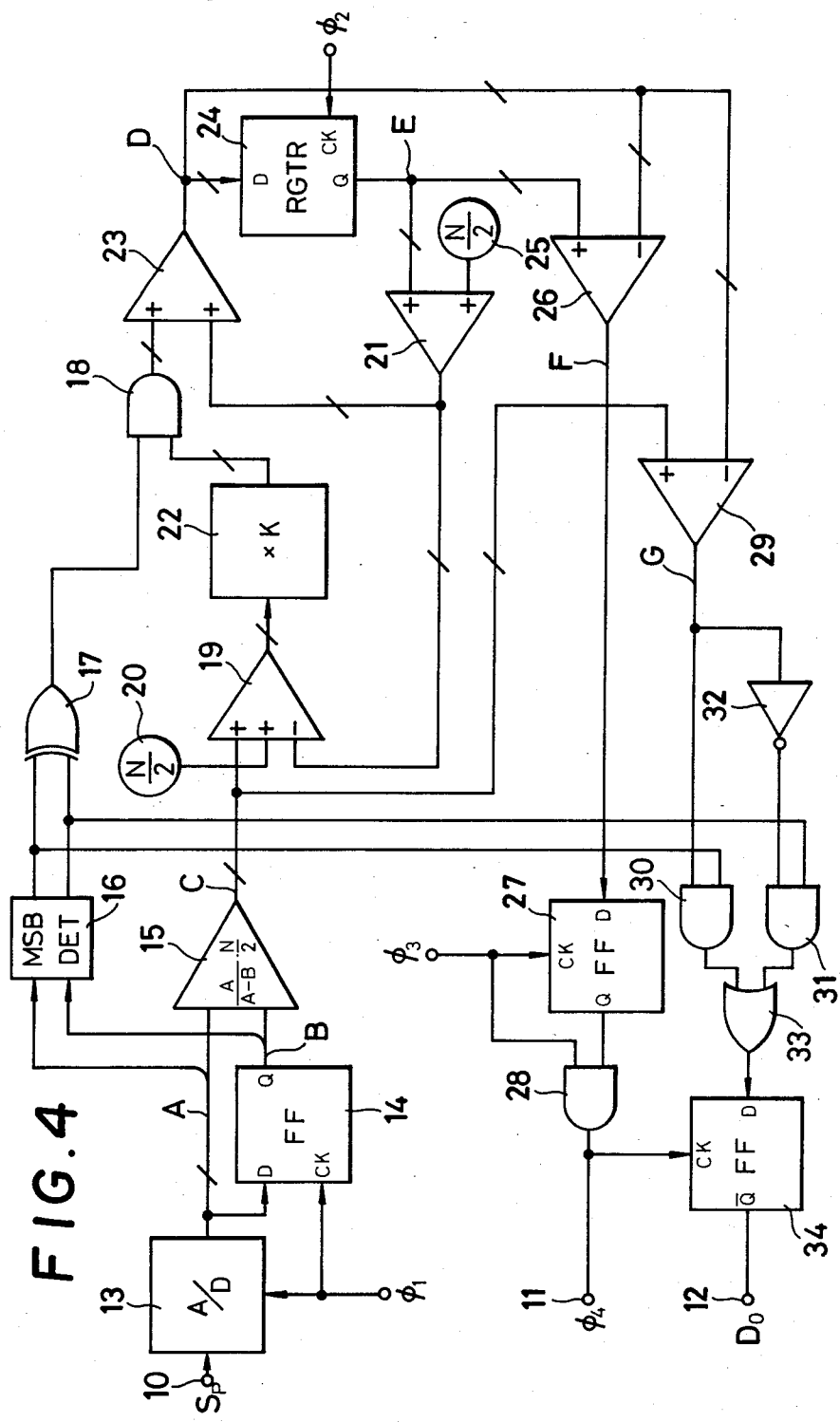
FIG. 4 is a block diagram of a digital data detecting apparatus according to an embodiment of the present invention.
Figure 5:
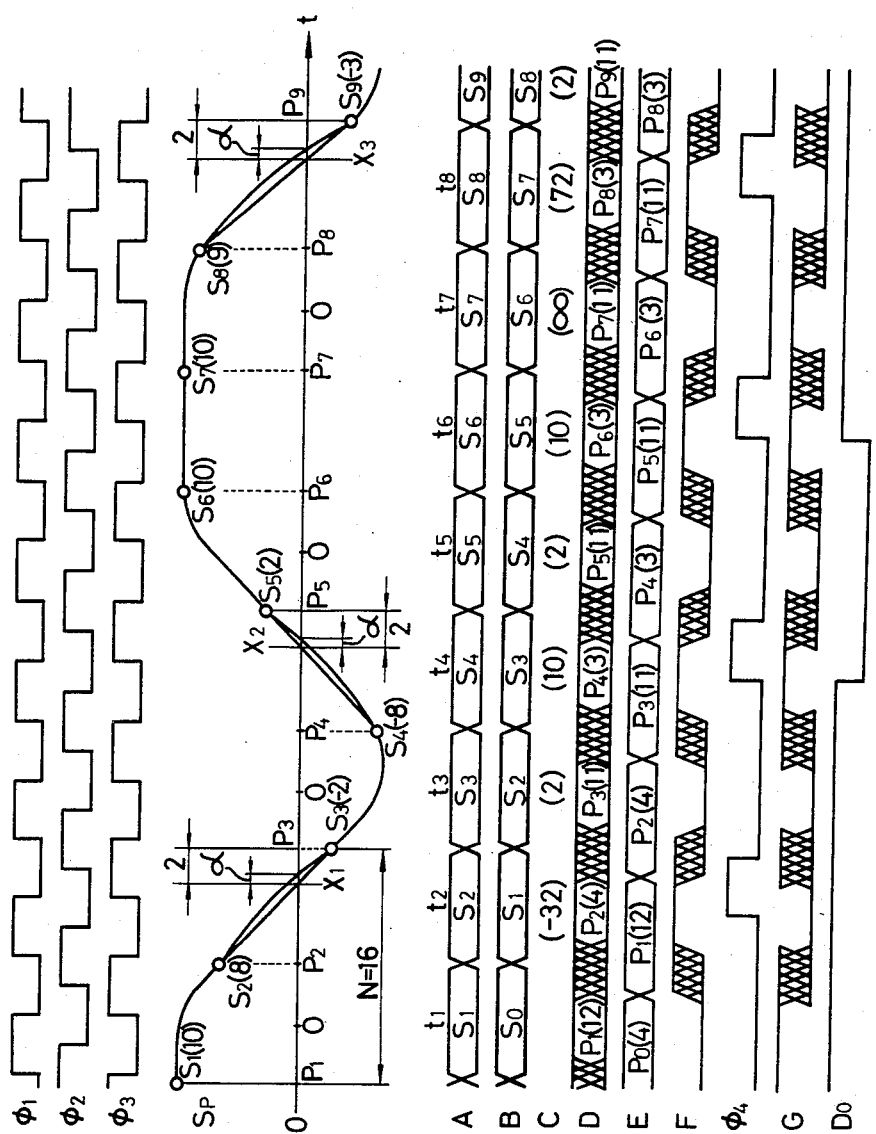
FIG. 5 is a timing chart showing operation of the digital data detecting apparatus shown in FIG. 4.

FIG. 4 shows a data detecting circuit according to the present invention for producing clocks from the successive signals in synchronism with the reproduced signals in the respective tracks and also for detecting the data in the respective tracks. FIG. 5 is a timing chart showing operation of the data detecting circuit of FIG. 4. Signals A through G in FIG. 5 are indicative of outputs generated at points A through G, respectively, in the circuit of FIG. 4. Clocks $\phi_1$, $\phi_2$, $\phi_3$, a reproduced signal Sp, an output clock $\phi_4$, and output data Do shown in FIG. 5 are denoted by identical reference characters in FIG. 4. For the brevity of illustration, it is assumed that an input terminal 10 illustrated in FIG. 4 is supplied with a reproduced signal Sp from a single track.

According to the illustrated embodiment, when the reproduced signal Sp having a channel bit rate f bits/sec. is applied to the input terminal 10, an output clock $\phi_4$ is produced by a digital PLL circuit from an output terminal 11 in synchronism with the reproduced signal Sp, and output data Do is also issued from an output terminal 12.

The principles of operation for generating the clock $\phi_4$ and the output data Do will now be described.

Figure 2:
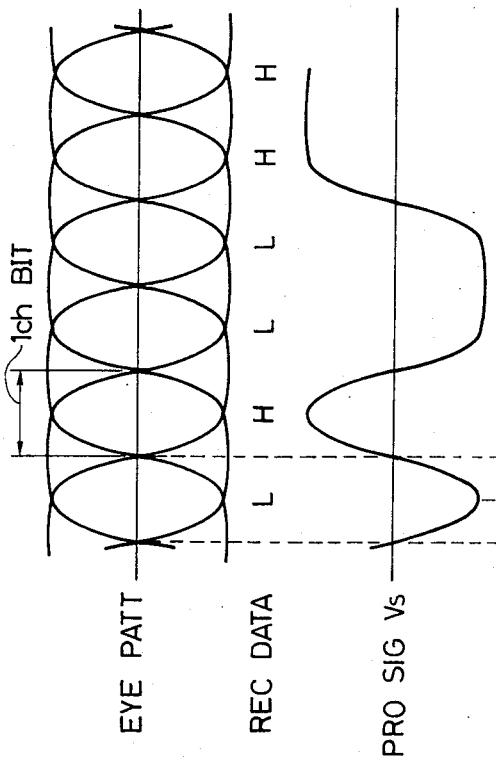
FIG. 2 is a diagram of signal waveforms illustrative of a conventional process of detecting digital data.

In FIG. 5, the signal Sp is converted into digital data $S_1, S_2, \ldots S_9$ by sampling the signal Sp with the clock $\phi_1$ having a frequency of 2f Hz. Then, the phase positions $p_1$–$p_9$ of sampling points for these data $S_1$–$S_9$ are checked by detecting the points where the signal Sp intersects a detection level (which is assumed here to be zero level for simplicity) and expressing the phase positions $p_1$–$p_9$ of the data $S_1$–$S_9$ based on the zero-crossing points. The zero-crossing points are the points where the original data (recorded data) of the signal Sp vary from "H" to "L" or "L" to "H", and such points are representative of 180° phases of the clock in synchronism with the signal Sp (see FIG. 2).

One period, that is, 0°–360°, (two sampled lengths of the data $S_1$–$S_9$=two periods of the clock $\phi_1$) of the clock in synchronism with the signal Sp is divided into N=16 sections with their phase positions expressed by the numerals 0, 1, 2, ... 15, respectively. Therefore, the above zero-crossing points can be expressed by N/2=8.

In the embodiment illustrated in FIG. 5, the zero-crossing points are present as $x_1$, $x_2$, $x_3$ between $S_2$ and $S_3$, $S_4$ and $S_5$, $S_8$ and $S_9$, respectively. Where there is such a zero-crossing point between data $S_i$ and $S_{i+1}$, the phase position $P_{i+1}$ of the data $S_{i+1}$ can be determined by the following arithmetic operation:

$$P_{i+1} = \frac{S_{i+1}}{S_{i+1} - S_i} \cdot \frac{N}{2} + \frac{N}{2}$$

For example, the phase position $P_3$ can be determined by:

$$P_3 = \frac{S_3}{S_3 - S_2} \cdot \frac{N}{2} + \frac{N}{2}$$

By connecting $S_2$ and $S_3$ with a straight line, the point $x_1$ can be given as the length (time difference) from the zero-crossing point on the straight line to the sampling point for the data $S_3$. There is therefore an error $\alpha$ between such a zero-crossing point and the actual zero-crossing point of the signal Sp, but such an error $\alpha$ can be corrected. Assuming that the data $S_2$, $S_3$ have values "8", "−2", respectively, the phase position $P_3$ of the data $S_3$ is spaced from the zero-crossing point $x_1$ by $$\frac{S_3}{S_3 - S_2} \cdot \frac{N}{2} \approx \text{``2''}$$

(the length of about two divided sections with N=16). Since the point $x_1$ is expressed N/2="8" with the phase of 180°, the phase position $P_3$ of the point $S_3$ is expressed as 8+2="10". In reality, however, the phase position $P_3$ is corrected as described below and expressed as "11". The data $S_4$ following the data $S_3$ is negative as with the data $S_3$, and is spaced from the data $S_3$ by N/2="8", so that the phase position $P_4$ of the data $S_4$ can be given by 11 + 8 = "19". Actually, $P_4$ is expressed by 19−N="3". The phase position $P_5$ of the next data $S_5$ is determined by detecting the interval between the zero-crossing point $x_2$ and the phase position $P_5$ and adding "8" to the detected interval. Since the data $S_5$ through $S_8$ are positive, their phase positions $P_5$ through $P_8$ can be found by successively adding "8". Thus, phase position signals can be obtained which are indicative of the phase positions of the data $S_1$–$S_9$ in terms of $P_1$–$P_9$. The clock $\phi_4$ in synchronism with the signal Sp and the data Do can be detected from the phase position signals.

The clock $\phi_4$ is detected as follows:

Since the points $x_1$, $x_2$, $x_3$ represent 180° phases of the clock $\phi_4$ of the signal Sp, the positions spaced from the points $x_1$, $x_2$, $x_3$ successively by the length "8", that is, the points expressed by "0", are indicative of 0° phases of the clock $\phi_4$. The 0° phases serve as data detecting points for the signal Sp (see FIG. 2). By detecting these 0° phases from the above phase position signals and generating a clock in synchronism with the detected points, the clock $\phi_4$ can be produced. The 0° phases can be detected by comparing $p_i$, $p_{i+1}$ at all times based on the phase position signals. When $p_i > p_{i+1}$, there is a 0° phase therebetween. For example, when the phase positions $p_1$, $p_2$ of the data $S_1$, $S_2$ are "12", "4", respectively, and the phase positions go from "12" to "4", they successively follow the sequence "12", "13", "14", "15", "0", "1", "2", "3", "4". Since there is "0" in between, it can be determined that there is a 0° phase or a data detecting point between the data $S_1$, $S_2$. When the phase positions $p_2$, $p_3$ of the data $S_2$, $S_3$ are "4", "11", respectively, the phase positions follow the sequence: "4", "5", "6", ... "10", "11" as they go from "4" to "11". With no "0" in between, it is determined that there is no 0° phase between the data $S_2$, $S_3$.

The data of the signal Sp can be attained by determining whether the reproduced signal Sp corresponding to each data detecting point of the detected 0° phase is positive or negative.

Operation of the circuitry shown in FIG. 4 based on the foregoing principles will be described. The circuitry of FIG. 4 has a portion consituted by a digital PLL circuit as described below.

The signal Sp applied to the input terminal 10 is fed to an A/D converter 13 in which the signal is sampled with the clock $\phi_1$ and converted into the digital data $S_1$–$S_9$ which are successively issued to a point A. The data $S_1$–$S_9$ are delayed one period of the clock $\phi_1$ by a D flip-flop (hereinafter referred to as "FF") 14 and then fed to a point B. The data from the points A, B are applied to an arithmetic circuit 15 in which an arithmetic operation:

$$\frac{A}{A-B} \cdot \frac{N}{2}$$

is effected to determine the intervals between the zero-crossing points and the sampling phase positions. Assuming that the data $S_1$–$S_9$ have values "10", "8", "−2", "−8", "10", "10", "9", "−3", the results of the arithemetic operation which appear at a point C are "−32", "2", "11", "2", "10", "∞", "−72", "2". The outputs from the points A, B are also applied to an MSB (sign bit) detecting circuit 16 which detects an MSB of each data. In the example of FIG. 5, when the data $S_3$ is fed to the point A and the data $S_2$ is fed to the point B in the time slot $t_3$, their MSBs are different from each other. Accordingly, an exclusive-OR gate 17 supplied with the different MSBs produces an output of "H" level to open an AND gate 18. The output "2" at the point C at this time is representative of the time difference between the phase position $p_3$ of the data $S_3$ and the point $x_1$. The output "2" is added by an adder 19 to $N/2(=8)$ delivered from an N/2 generator 20. The sum $2+8$="10" is thus obtained as determining the phase position $p_3$ of the data $S_3$ through the arithmetic operation. To the adder 19, there is applied an output from an adder 21, such as a value "12" indicative of an expected value of the phase position $p_3$ of the data $S_3$, as described later. The adder 19 performs an arithmetic operation to determine the difference between the sum and the expected value, that is, $10-12=-2$. The output "−2" from the adder 19 is applied to a coefficient multiplier 22 in which the output from the adder 19 is multiplied by a coefficient K ($0 \leq K \leq 1$). If K=0.5, then the coefficient multiplier 22 issues an output $-2 \times 0.5 = -1$. The output "−1" is applied as a corrective value for $p_3$ through the AND gate 18 to an adder 23. Since the adder 23 is supplied with the expected value "12" from the adder 21, the adder 23 effects the addition $-1+12=11$ and issues the result to a point D. The output "11" is held in a register 24 as the corrected $p_3$ of the data $S_3$, the register 24 comprising an m-bit ($2^m = N$) register.

The expected value "12" is obtained simply by adding "8" to the value "4" of the phase position $p_4$ of the data $S_4$ determined in an immediately prior time slot $t_2$. The value "12" is compared by the adder 19 with the value "10" calculated by the arithmetic circuit 15 for the correction by "−2" due to jitter. After the correction is additionally revised into "−1" by the coefficient multiplier 22, the phase position $p_3$ is corrected into "11". The coefficient K serves to compensate for the error α at the point $x_1$.

The data in the register 24 is read by the clock $\phi_2$ which is 90° delayed with respect to the clock $\phi_1$, and the read-out value "11" is delivered to a point E and then to the adder 21 in which the value "11" is added to $N/2$ (=8) from an N/2 generator 25. When the data $S_4$, $S_3$ appear in the points A, B, respectively, in a next time slot $t_4$ at the timing of the clock $\phi_1$, the exclusive-OR gate 17 issues an output of "L" level since their MSBs are the same (negative), thus closing the AND gate 18. The output from the coefficient multiplier 22 is not applied to the adder 23, to which only the output $(11+8)-N=3$ is fed from the adder 21. The output "3" is substantially representative of the phase position $p_4$ of the data $S_4$ and is applied to the register 24. At this time, the phase positions $p_4$, $p_3$ appear respectively at the points D, E. More specifically, the phase position $p_{i+1}$ of the data $S_{i+1}$ from the point A appear at the point D, and the phase position $p_i$ of the data $S_i$ from the point B appear at the point E.

In a succeeding time slot $t_5$, the point $x_2$ is determined on the basis of the data $S_4$, $S_5$ at the points A, B, and the phase position $p_5$ of the data $S_5$ is corrected into "11" based on the point $x_2$. Since the data $S_5$ through $S_8$ are positive in the signal Sp, the phase positions $p_6$, $p_7$, $p_8$ are obtained by successively adding N/2. The point $x_3$ is further detected to correct the phase position $p_9$ of the data $S_9$. The same operation will then be repeated. Thus, the phase position signals indicative of the phase positions $p_1$–$p_9$ of the data $S_1$–$S_9$ are produced at the point D, and the phase position signals generated by delaying the above phase position signals with the clock $\phi_2$ are produced at the point E. In the example of FIG. 5, the phase positions $p_1$–$p_9$ are "12", "4", "11", "3", "11", "3", "11", "3", "11", respectively.

With the foregoing arrangement, a digital PLL circuit is composed substantially of the adder 19, the coefficient multiplier 22, the AND gate 18, the adder 23, the register 24, and the adder 21. The register 24 and the adder 21 substantially constitute a VCO (voltage-controlled oscillator) in the PLL circuit, the adder 19 having the substantial function of a phase comparator. The coefficient multiplier 22 serves to determine the loop gain of the PLL circuit. The digital PLL circuit is capable of producing the phase position signals as the output from the adder 21, or the output at the point D, or the output at the point E.

Data detecting points are detected from the phase position signals as follows: If the phase position $p_1$ of the data $S_1$ is "12", for example, then it is found that there is a point "0" in the length "8" up to the next sampling point (the position of $S_2$). If the phase position $p_2$ of the data $S_2$ is "4", for example, then it is found that there is no point "0" in the interval up to the next sampling point (the position of $S_3$). It can thus be determined that if the value obtained by adding "8" to a certain phase position $p_i$ is more than "16 (=0)", then there is a 0° phase in the interval up to the next phase position $p_{i+1}$, and if the value produced by adding "8" to $p_i$ is smaller than "16", then no 0° phase is present in the interval up to the next phase position $p_{i+1}$.

The above process of determination however has the following drawback: If a certain phase position $p_i$ is "7", for example, then the next phase position $p_{i+1}$ is $7+8=15$, and it is determined that there is no 0° phase between $p_i$ and $p_{i+1}$ according to the above determining process. When the value $p_{i+1}$ is corrected into "1", for example, the above process determines that there is no 0° phase regardless of the fact that there is a 0° phase between $p_i$ and $p_{i+1}$ in reality.

To eliminate the above shortcoming, a comparator 26 is provided according to the present embodiment for comparing the outputs at the points D, E, that is, $p_i$ and $p_{i+1}$. When $p_i > p_{i+1}$, a "0" point is regarded as being present between data $S_i$ and $S_{i+1}$, and the comparator 26 issues an output of "H" level to a point F. According to the example of FIG. 5, there are data detecting points between $S_1$ and $S_2$, $S_3$ and $S_4$, $S_5$ and $S_6$, and $S_7$ and $S_8$, and the outputs of "H" level indicative of the data detecting points appear at the point F at the above timing.

The output from the point F is applied to a D terminal of an FF 27 which is driven by the clock $\phi_3$ that is 90° delayed with respect to the clock $\phi_2$. A Q output from the FF 27 and the clock $\phi_3$ are applied to an AND gate 28 to produce the clock $\phi_4$ at the output terminal 11, The clock $\phi_4$ will be employed in actual data detection as described later on.

The method of detecting data will be now be described. Data detection can be known from data on opposite sides of a data detecting point indicated by an output of "H" level at the point F. In FIG. 5, there is a data detecting point "0" between $p_1$, $p_2$, and data $S_1$, $S_2$ on opposite sides of the data detecting point "0" are "positive". Therefore, the data sought is "H". There is also a data detecting point "0" between $p_3$, $p_4$, and data $S_3$, $S_4$ on opposite sides of the data detecting point are "negative". Accordingly, the data is "L". Two data $S_i$, $S_{i+1}$ spaced ½ sampling periods back and forth from these data detecting points are normally of the same sign, and one data substantially free from any error can be determined per two sampling operations. Whether the two data $S_i$, $S_{i+1}$ are "positive" or "negative" can be determined by finding if the MSBs of the data $S_i$, $S_{i+1}$ are "H" or "L".

Figure 6:
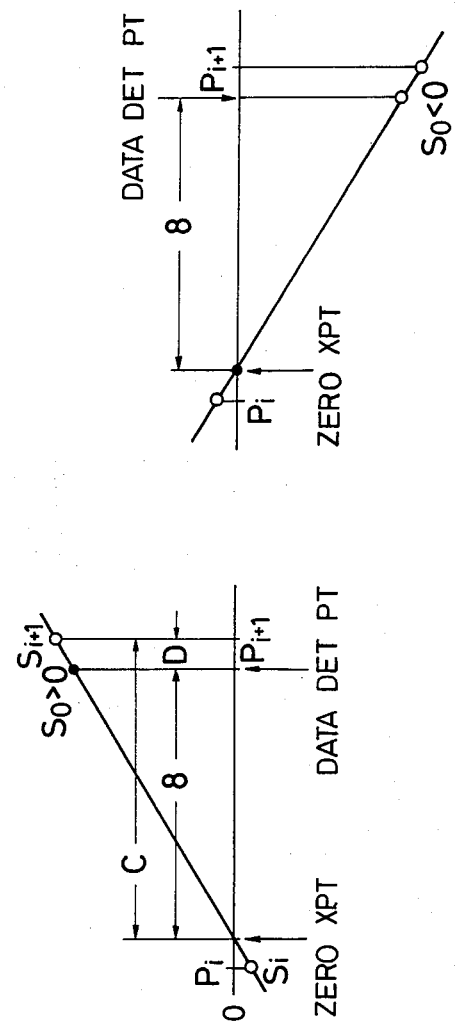
FIG. 6 is a set of diagrams showing an example of digital data detection.

The forgoing data detecting method may suffer from the following difficulty:

There is an instance as shown in FIG. 6 at A and B in which there are a zero-crossing point and a data detecting point between the phase positions $p_i$, $p_{i+1}$ of two data $S_i$, $S_{i+1}$. In FIG. 6 at A, data So sought is "H", and in FIG. 6 at B, data So sought is "L". With above data detecting method, the MSBs of the data $S_i$, $S_{i+1}$ on opposite sides of the data detecting point are of different signs, and which data should be employed cannot be determined.

To overcome the above problem, a comparator 29 is provided according to the present embodiment for comparing the outputs at the points C, D, and issuing an output of "H" level to a point G when the output at the point C is greater than the output at the point D. The output from the point C indicates the time interval from the zero-crossing point to the sampling time $p_{i+1}$, while the output from the point D represents the time interval from the data detecting point to the sampling time $p_{i+1}$. When any situation as shown in FIG. 6 at A and B arises, the output from the point C becomes larger than the output from the point D, and the signal So at the data detecting point has the same sign as that of the data $S_{i+1}$. Conversely, when the output from the point C is smaller than the output from the point D, the signal So at the data detecting point has the same sign as that of the data $S_i$. Cosequently, data can be determined by checking the MSB of the data $S_{i+1}$ in FIG. 6 at A and B.

The output from the point G is applied to one terminal of an AND gate 30 and inverted by an inverter 32, the inverted output being fed to one terminal of an AND gate 31. The other terminal of the AND gate 30 is supplied with the MSB of data $S_{i+1}$ from the point A through the MSB detecting circuit 16. The other terminal of the AND gate 31 is supplied with the MSB of data $S_i$ from the point B through the MSB detecting circuit 16. The output from the point C is meaningless in occasions other than zero-crossing point detection, and an output of "H" or "L" level normally appears at the point G. Outputs from the AND gates 30, 31 are fed through an OR gate 33 to the D terminal of an FF 34 driven by the clock $\phi_4$.

With the above construction, the two MSBs from the MSB detecting circuit 16 are normally both "positive" or "negative", and the output from the point G is normally of "H" or "L". Therefore, the output from either the AND gate 30 or the AND gate 31 is of the level corresponding to the MSB, and is applied through the OR gate 33 to the FF 34. The FF 34 issues data Do from a $\overline{Q}$ terminal thereof to the output terminal 12 with the clock $\phi_4$ serving as data detection timing. In FIG. 6 at A, the output from the point G becomes "H" level, and the MSB applied to the AND gate 30 becomes "positive". The AND gate 30 now produces data of "H" level. In FIG. 6 at B, the MSB applied to the ANd gate 31 is "negative" so that data of "L" level is obtained.

The output data Do is demodulated by a following demodulator, written into a memory, and read out of the memory at a proper timing to thereby remove jitter.

The foregoing arrangement has been directed to the detection of data of the signal reproduced from a single track. A circuit arrangement for detecting data from successive signals generated by successively sampling n signals reproduced from n tracks as described with reference to FIG. 3 will then be described with reference to FIG. 7.

Figure 7:
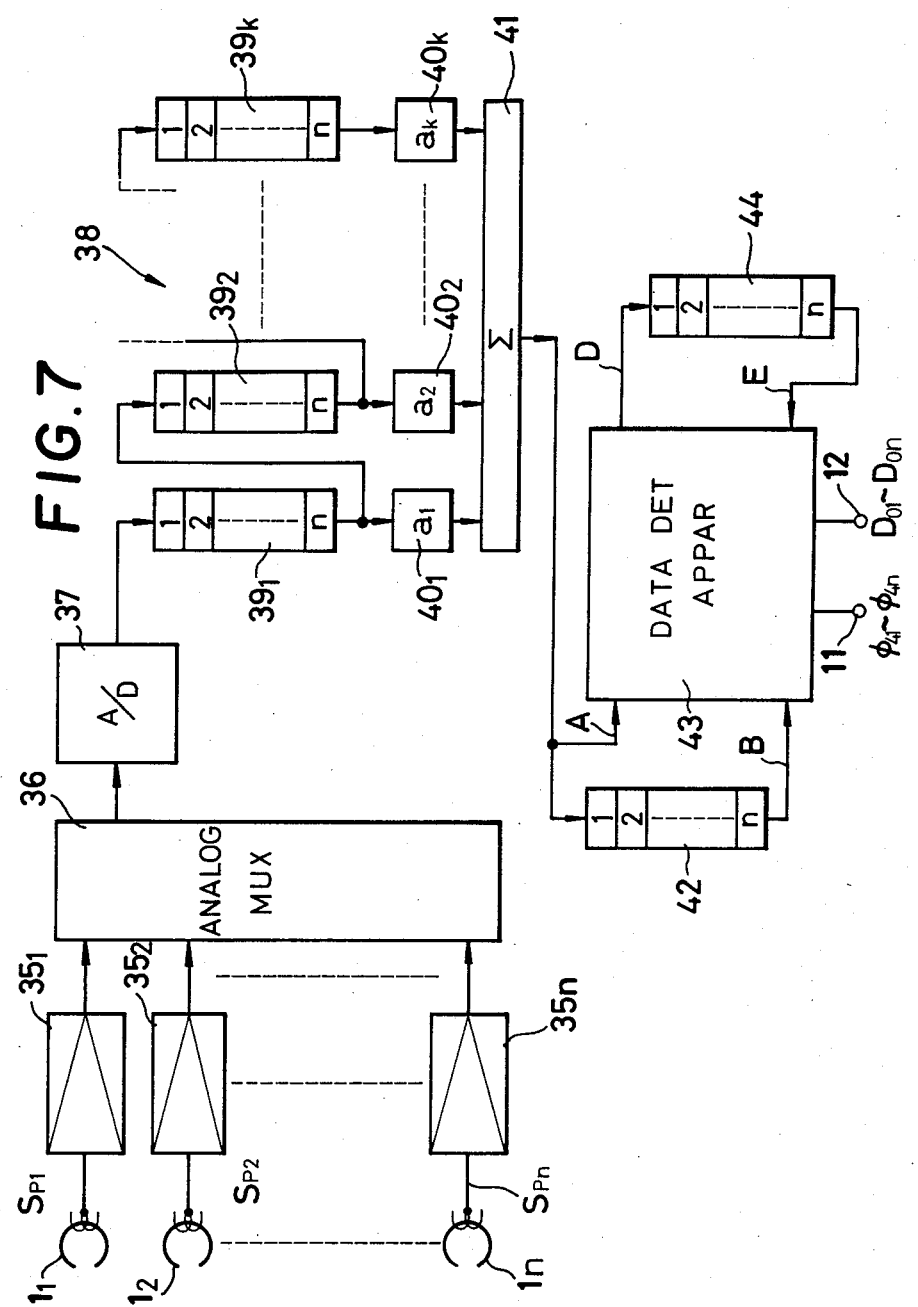
FIG. 7 is a block diagram of a multitrack playback circuit in which the present invention is incorporated.

As shown in FIG. 7, reproduced signals $Sp_1-Sp_n$ from n heads $1_1-1_n$ are applied through preamplifiers $35_1-35_n$, respectively, to an analog multiplexer 36. The multiplexer 36 samples the reproduced signals $Sp_1-Sp_n$ as shown in FIG. 3 at A, B, C, and produces successive signals as shown in FIG. 3 at D. The successive signals are converted by an A/D converter 37 into digital successive signals which are fed to an equalizer circuit 38. The equalizer circuit 38 is constructed as a digital filter comprising k n-stage shift registers $39_1-39_k$, coefficient multipliers $40_1-40_k$ for multiplying outputs from the shift registers $39_1-39_k$ by respective coefficients $a_1$, $a_2-a_k$, and a register 41.

The shift registers $39_1-39_k$ produces outputs which are the data of the signals reproduced from the same tracks at all times. These data are multiplied by the coefficients in the coefficient multipliers $40_1-40_k$, and then converted by the register 41 into successive signals. The successive signals comprise digital successive signals which have been converted by the A/D converter 37 and corrected by the equalizer circuit 38. The corrected successive signals are applied to an n-stage register 42 and a digital data detecting apparatus 43. The digital data detecting apparatus 43 is constructed as shown in FIG. 4 except that the A/D converter 13 and the register 24 in FIG. 4 are replaced with the A/D converter 37 and the n-stage register 44 in FIG. 7. The points A, B, D, E in FIG. 7 correspond respectively to those shown in FIG. 4.

With the above arrangement of FIG. 7, data $S_{i+1}$, $S_i$ on the same tracks appear at the points A, B successively from track to track, and are processed successively from track to track in the operation described with reference to FIGS. 4 and 5. As a result, clocks $\phi_{41}-\phi_{4n}$ of each track are sequentially issued to the output terminal 11, and data $D_{o1}-D_{on}$ are sequentially issued to the output terminal 12. The registers $39_1-39_k$ may be replaced with BBD CCD, in which case the A/D converter 37 is disposed between the equalizer circuit 38 and the digital data detecting apparatus 43.

The foregoing description has been directed to the application incorporating the NRZ modulation system with a window margin of 1T (T = 1/f when the channel bit rate is f bits/sec.). Where other modulation systems than the NRZ, such as MFM, Miller$^2$, 3PM, HDM systems, are employed in which the window margin is 0.5T and the shortest wavelength $\geq$ 2T (minimum magnetization reversing width $\geq$ 1T), the channel bit rate is 2/T (2f bits/sec.). In this case, the sampling frequency for the reproduced signals in FIGS. 3 and 5 becomes 4f Hz. Since f=1/T or below is enough for the signal bandwidth, the sampling efficiency is higher than necessary. The circuitry of FIG. 8 is used in such an instance.

Figure 8:
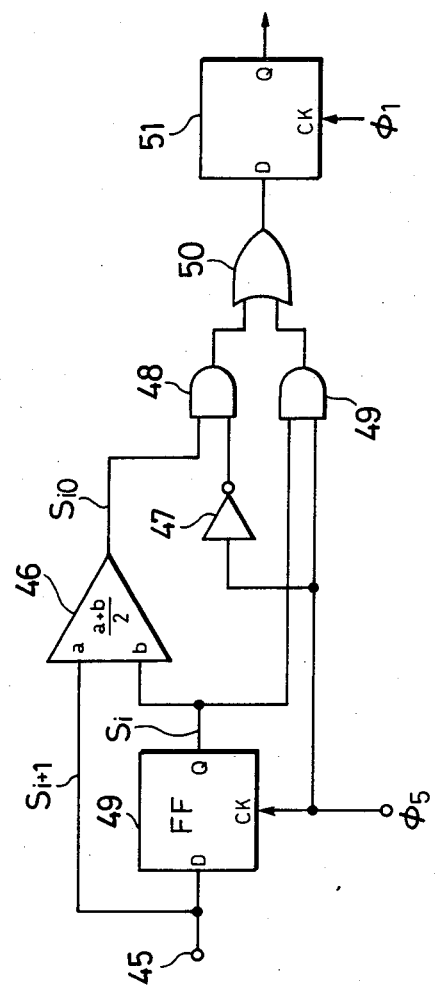
FIG. 8 is a block diagram of a digital data detecting apparatus according to another embodiment.

As shown in FIG. 8, data sampled at 2f Hz is applied to an input terminal 45. The data is then applied to a terminal a of an arithmetic circuit 46, and delayed by an FF 49 driven by a clock $\phi_5$ and also applied to the arithmetic circuit 46. The arithmetic circuit 46 effects the arithmetic operation (a+b)/2 to obtain a value $S_{io}$ intermediate between the current data $S_{i+1}$ and the delayed data $S_i$ immediately prior thereto. The intermediate data $S_{io}$ and a clock obtained by inverting the clock $\phi_5$ in an inverter 47 are applied to an AND gate 48. The data $S_i$ and the clock $\phi_5$ are fed to an AND gate 49. Outputs from the AND gates 48, 49 are delivered to an OR gate 50 which produces data in the order of $S_i$, $S_{io}$, $S_{i+1}$. Stated otherwise, the data sampled at 2f Hz can be produced as data sampled at apparently doubled frequency. These data are corrected for jitter by an FF 51 driven by the clock $\phi_1$, and applied to the point A in FIG. 4.

Figure 1:
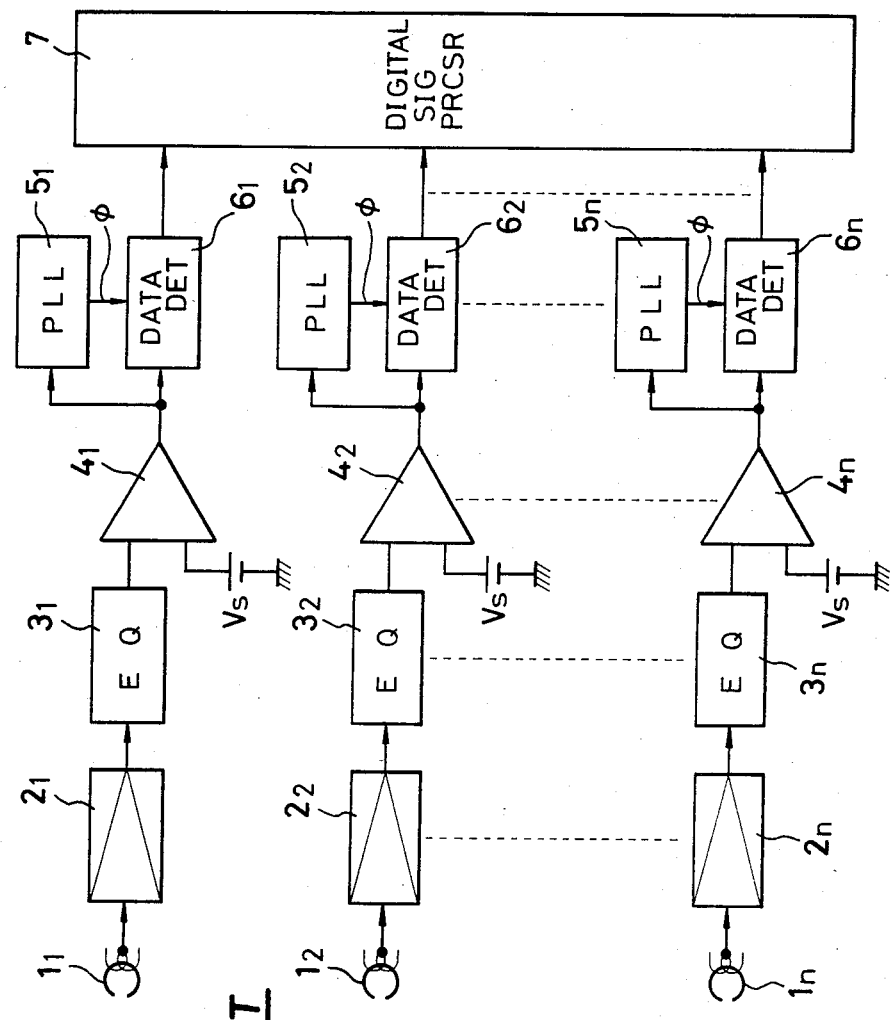
FIG. 1 is a block diagram of a conventional playback circuit for use in a digital tape recorder.

In the foregoing arrangement, the equalizer circuit 38 and the digital detecting apparatus 43 can be shared by the n tracks, and the overall circuitry is simpler than the conventional circuitry shown in FIG. 1. The circuitry can be implemented by an integrated circuit because of its digital signal processing capability.

With the present invention, the playback circuit for use in a digital recording and reproducing apparatus incorporating a multitrack recording system can be simplified in construction and can be fabricated as an integrated circuit.

Although certain preferred embodiments have been shown and described, it should be understood that many changes and modifications may be made therein without departing from the scope of the appended claims.

What is claimed is:

1. A digital data detecting apparatus comprising:
   (a) means for sampling an input digital signal at a frequency which is M times (M>1) higher than a channel bit rate;
   (b) means responsive to two adjacent sampled values for computing an interval from a point where said digital signal intersects a reference level to a sampling time; and
   (c) means responsive to an output from said computing means for generating a data detecting signal for detecting data of the digital signal.

2. A digital data detecting apparatus according to claim 1, wherein said generating means comprises means for generating a phase position of a sampling time with a channel bit period being divided into N equal sections having phase positions expressed by 0 through N−1, means for comparing a value obtained by adding N/2 to said output from said phase position computing means with an output from said phase position generating means, means responsive to an output from said comparing means for controlling said phase position generating means, and means for generating the data detecting signal in response to an output from said phase position generating means.

3. A digital data detecting apparatus according to claim 1, wherein said input signal comprises successive signals generated by sampling a plurality of digital signals at mutually different timings.

4. A digital data detecting apparatus according to claim 2, wherein said data detecting signal generating means includes means for generating a data detecting signal by determining that when the phase positions $p_i$, $p_{i+1}$ of two adjacent sampling times have the relationship: $p_i > p_{i+1}$, there is a data detecting point between the phase positions of said two sampling times.

5. A digital data detecting apparatus according to claim 2, wherein said phase position $p_{i+1}$ of the sampling time is compared with the output from said computing means, and when the $p_{i+1}$ is larger than the output from said computing means, the sampled data at the phase position $p_{i+1}$ is regarded as data to be detected, and when the $p_{i+1}$ is smaller than the output from said computing means, the sampled data at a phase position $p_i$ is regarded as data to be detected.

* * * * *